April 18, 1939.     E. RUSPOLI     2,154,701
DIFFERENTIAL MECHANISM
Filed April 22, 1936     5 Sheets-Sheet 1
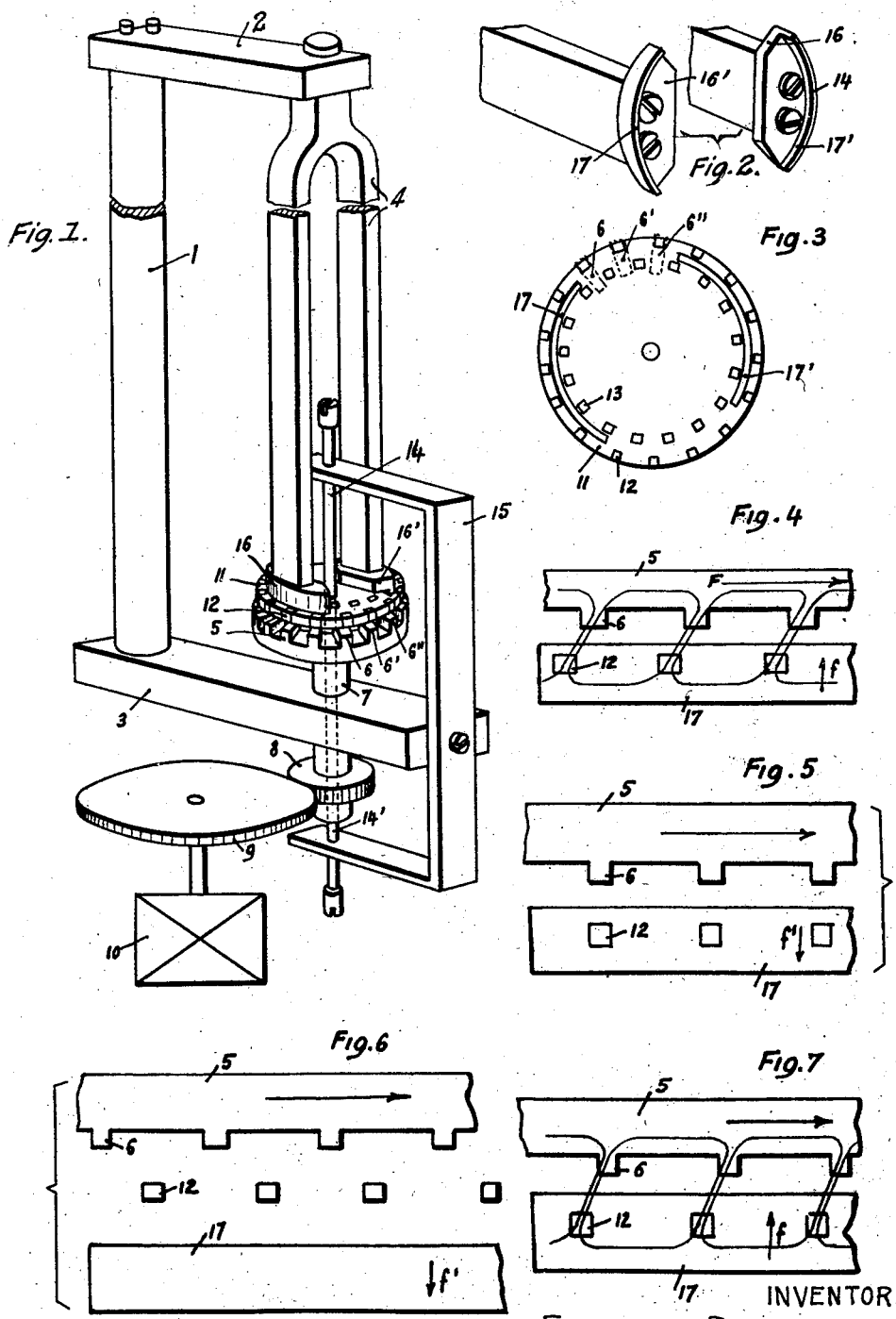
INVENTOR.
EDMONDO RUSPOLI
By Emil Bönnelycke
ATTORNEY

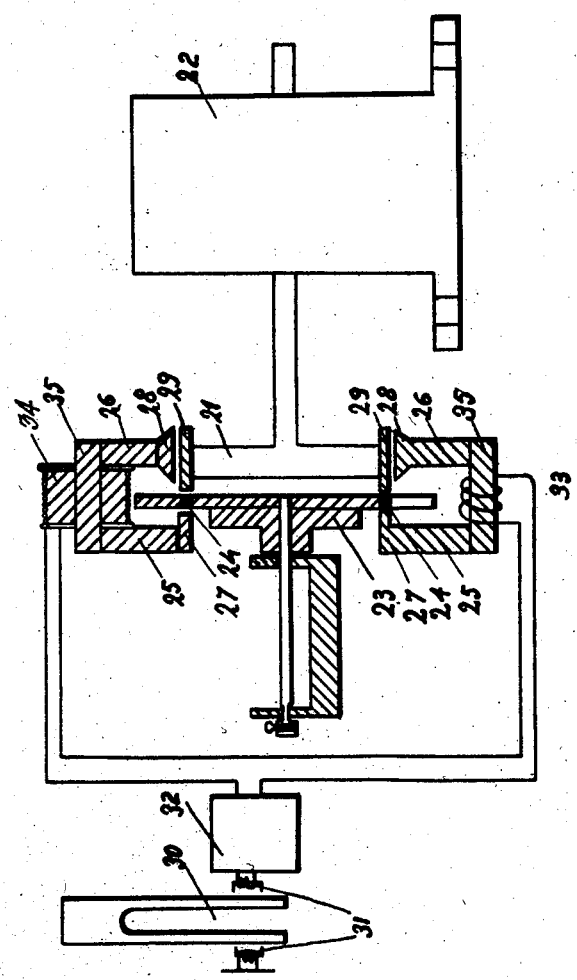

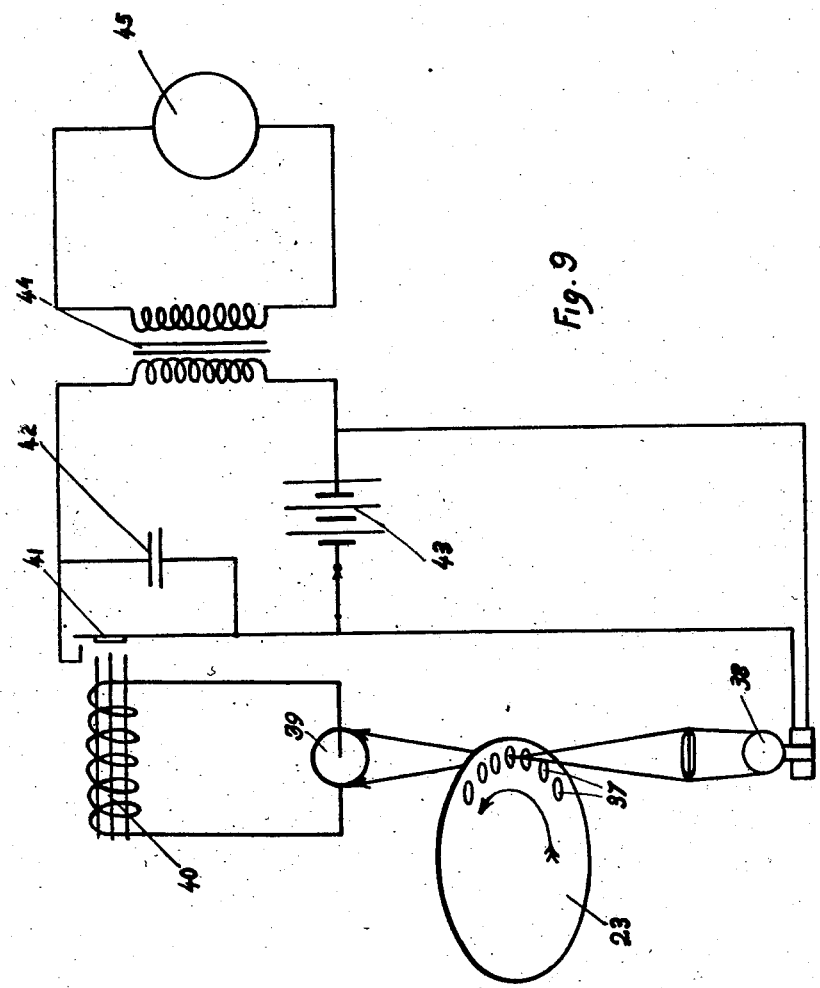

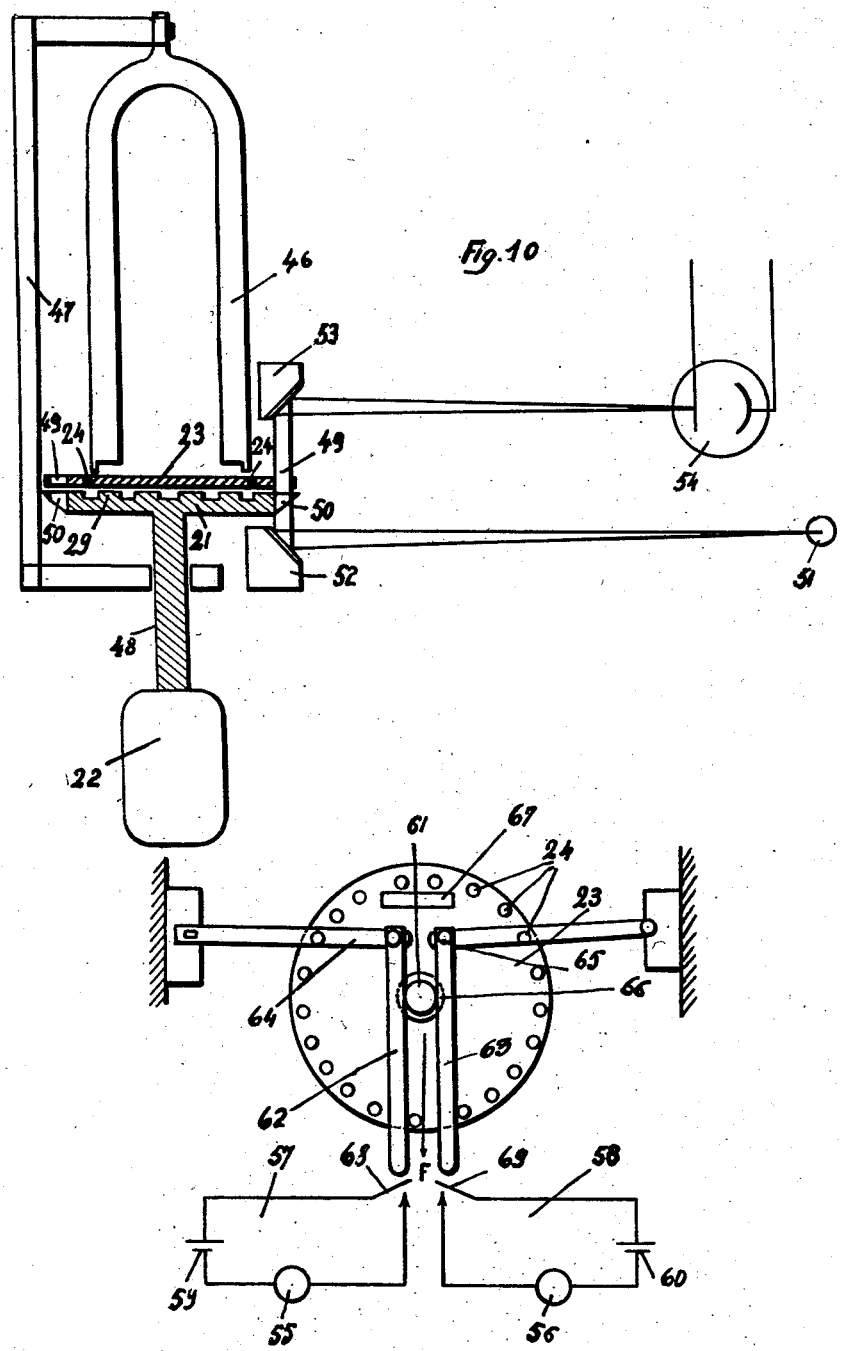

April 18, 1939.   E. RUSPOLI   2,154,701
DIFFERENTIAL MECHANISM
Filed April 22, 1936   5 Sheets-Sheet 5
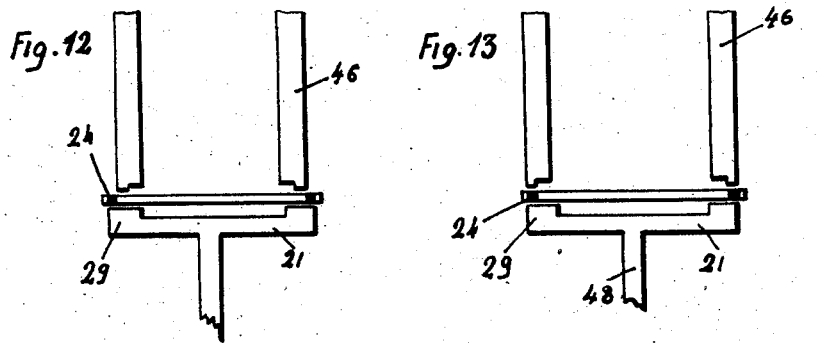
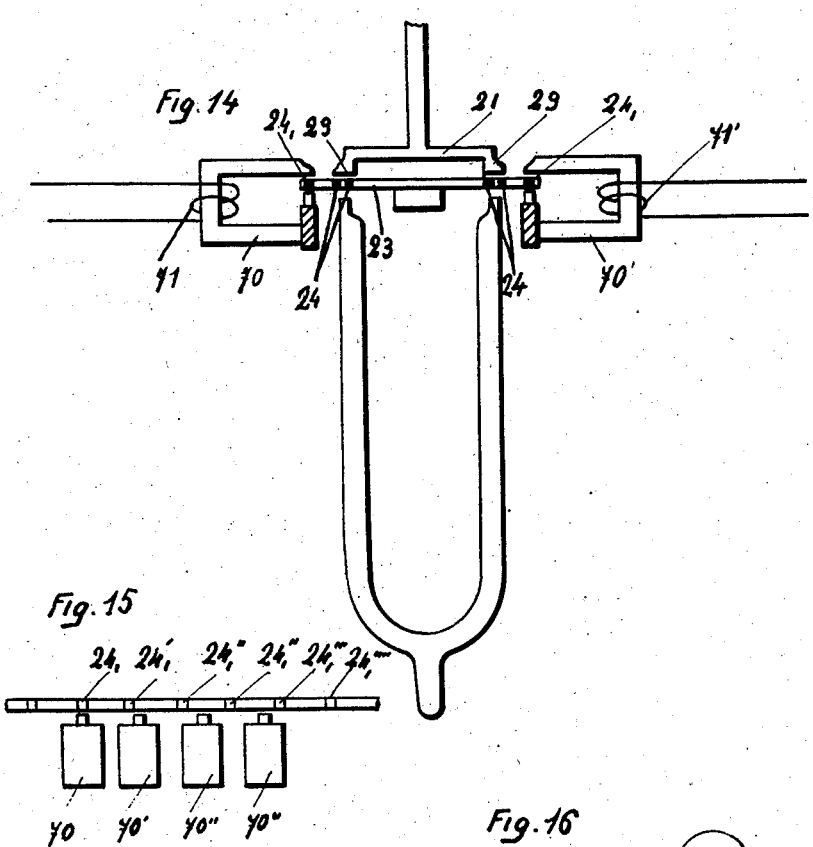
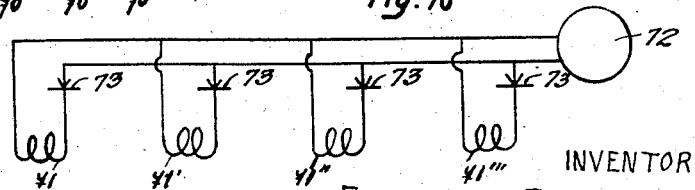
INVENTOR
EDMONDO RUSPOLI
By Emil Bönnelycke
ATTORNEY Patented Apr. 18, 1939

2,154,701

UNITED STATES PATENT OFFICE 2,154,701

DIFFERENTIAL MECHANISM

Edmondo Ruspoli, Paris, France

Application April 22, 1936, Serial No. 75,872
In France April 24, 1935

10 Claims. (Cl. 175—368)

This invention relates to a differential mechanism and method of operating the same and has for an object the provision of a simple, inexpensive method of operating a tuning fork or equivalent source of standard vibrations to obtain accurate frequency of sound, electrical impulses or the like.

Another object is to provide a differential mechanism employing a standard source of frequency, an unknown source of frequency, and means controlled by said frequencies whereby the unknown frequency or speed can be measured, or compared with the standard frequency or speed.

Another object is to provide a method of producing current impulses of constant frequency.

Still another object is to provide a method and mechanism for giving a magnified record of minute gains or losses in line frequencies, as compared to a standard.

A further object is to provide a simple and inexpensive method and apparatus for observing errors in watches.

Still a further object is to provide a method and mechanism of effecting remote control of electrical apparatus.

Further objects will be apparent from the following specification; the method herein disclosed having a large number of applications at once apparent as soon as the method is disclosed. It will therefore, be understood that the apparatus or mechanism herein disclosed is merely illustrative of the invention and this disclosure is not to be regarded as limiting the scope of the appended claims.

In the accompanying drawings:

Figure 1 is a perspective view of a differential mechanism embodying the invention and adapted to carry out the method of operation as herein disclosed;

Figure 2 is a perspective detail view of the polar ends of the tuning fork 4, Figure 1;

Figure 3 is a plan view of the rotor 11, Figure 1;

Figures 4 to 7 inclusive are diagrams illustrating the operation of the device shown in Figure 1;

Figure 8 is a diagram illustrating a modification of the device shown in Figure 1 and particularly adapted to compare frequencies according to the method herein disclosed;

Figure 9 is a diagram illustrating means for utilizing this invention to measure the difference between a known and unknown frequency;

Figure 10 is a diagram illustrating a further use of the method and a device adapted to produce current impulses of constant frequency;

Figure 11 is a diagram showing a regulating device embodying the method herein disclosed and claimed;

Figures 12 and 13 are diagrams illustrating the relationship between the armature 29, rotor inserts 24 and tuning fork 46 as hereinafter described;

Figure 14 is a modification of the device shown in Figure 8;

Figure 15 is a diagram of the rotor and associated magnets shown in Figure 14; and Figure 16 is a diagram of a rectifier system for use with the device shown in Figure 14.

A floating wheel or rotor, as herein described, without brushes or windings will assume a differential speed between two periodically and separately excited devices one of which may be a tuning fork. The rotor may serve as a zero indicator when it carries divisions as a dial and revolves before a pointer. Frequency or speed differences of the order of 1/100,000 between two sources may be indicated in a few seconds. The rotor may also be coupled to relay closing contacts or engine controls adapted to automatically correct speed variations and to effect remote control of various apparatus, circuits and the like.

The floating rotor may lie in a horizontal plane and carry small magnetic masses or inserts at regular intervals near its outer edge. These inserts are influenced from the lower side, in any suitable manner, by periodic variations in a magnetic field created either by alternating current, or by the mechanical rotation of a magnetized motor wheel, or armature. They are influenced on the upper side by being periodically covered and uncovered by the prongs of a tuning fork during the vibration of same, or they are influenced in any suitable manner in accordance with the method herein disclosed.

The mechanical driving speed of the aforesaid magnetized armature located below the rotor or the alternating electric frequency applied to a magnetic field replacing the armature aforesaid, may be automatically compared to the vibrations of the tuning fork which, therefore, serves as a standard or with a known frequency, if one is used instead of a fork. A floating rotor moving at differential speed serves to determine the difference.

It will at once be apparent that a method of this character may be employed for a large number of purposes, some of which will be briefly referred to herein. A suitable apparatus for carrying out the method herein disclosed is illustrated in the accompanying drawings.

Referring to Figure 1, the numeral 1 indicates a magnetized bar magnet to the ends of which are fixed the transverse upper and lower supports 2 and 3 which may be said to constitute polar extensions of the magnet 1.

A tuning fork 4 is suitably secured to the upper support 2 and is provided with fixed pole shoes or extensions 16, 16' having downwardly extending circumferentially arcuate edges 17, 17', as more fully shown in Figure 2. The extremities 17, 17' are, of course, both of the same magnetic polarity and when these vibrate, oscillate the flux in a path perpendicular to the air gap in which the rotor 11 revolves. In place of the fork 4 may be used any suitable structure having pole pieces 16, 16' and their edges 17, 17' and this structure may be energized by an electro-magnet to oscillate its poles, using a known frequency that would correspond to the known vibrations of a fork. As such arrangements are obvious to those skilled in the art, they are not described in detail herein.

A hollow shaft 7 is mounted in any suitable manner in the support 3 and carries a gear 8 which meshes with the gear 9 on the shaft of any suitable type of driving motor 10. If desired, the motor may directly drive the armature 5. On the upper end of shaft 7 is mounted an armature or wheel 5 of magnetic material provided on its periphery with projecting teeth 6, 6', 6'', which teeth project towards the pole shoes 16, 16' of the tuning fork 4.

Within the transverse air gap between the poles 16, 16' of the tuning fork and the rotatable armature 5, is positioned a rotor 11 having a vertical shaft 14, 14' partly within the shaft 7 and having hardened and ground pivot ends so as to turn with as little friction as possible in any type of suitable bearings in the support 15, which is secured to any part of the device, such as the support 3.

The rotor, as shown in detail in Figure 3, may consist of non-magnetic material, such as aluminum, Bakelite or the like and contains a plurality of small magnetic inserts 12 equally spaced in or near the periphery thereof, the distance between any two adjacent inserts being equal to or definitely related to, the adjacent teeth 6, 6' on the armature 5.

The rotor 11 may have a second row 13 of inserts, as shown in Figure 3, the inner set of inserts being staggered with respect to the outer set, so as to divide the intervals between the latter.

The air space between the rotor 11 and the teeth 6 on the armature 5 and the edges 17, 17' of the pole shoes on the tuning fork should be made as small as possible and it will be observed that the armature 5 and its teeth 6 are of one magnetic polarity and cause the flux at this pole of the magnetic circuit to revolve about an axis parallel to the direction of flux flow across the gap in which rotor 11 is placed. Also, that said rotated flux is oscillated by the action of fork 4 along a line perpendicular to the flux flow. The tuning fork 4 establishes about its free end a magnetic field having a known frequency of oscillation—the period of vibration of the fork— and both the vibrating poles are of the same magnetic polarity. The rotating armature 5, by reason of the teeth 6 thereon, establishes a rotating magnetic field, the pulsations of which are of different frequency than those produced by the fork and this last field—that produced by teeth 6—is of opposite polarity to the field at the fork tips.

The rotor 11, as shown in Figure 1, lies with its under side closely adjacent the teeth 6, 6', 6'' and with its upper side so that the bottom of the edges 17, 17' of the pole shoes 16, 16' of the tuning fork 4 are spaced slightly above and between the outer row of inserts 12 and the inner row of inserts 13.

When the tuning fork is at rest, the air gap and consequently the magnetic reluctance between the inserts in rotor 11 and the pole shoes of the tuning fork is greatest as the circular edges 17, 17' of these pole shoes do not fully cover the inserts; but if the fork is set in vibration, at the instant when the edges 17, 17' cover either the outer row 12 or the inner row 13 of the inserts, the air gap and consequently the reluctance between the inserts and the pole pieces is greatly reduced.

Likewise, during the rotation of the armature 5, the air gap and consequently the reluctance between the teeth 6 of same and the inserts 12, 13, will be less when the same are in line, and the air gap and reluctance will be greater when these do not correspond. Accordingly, magnetic flux will be conveyed alternately towards the outer and inner rows of inserts 12, 13 at a periodicity that will depend upon the relative speed between the armature 5 and the rotor 11.

The most intense flux through the rotor occurs when one set of inserts 12, 13 are covered by the edges 17, 17' of the pole shoes on the tuning fork and simultaneously the teeth 6 are in line with the inserts on their lower face. Under these conditions, flux due to the magnet 1 flows at a maximum and there is a strong magnetic attraction between the inserts in the rotor and the pole pieces 16, 16' and the teeth 6, 6', etc. This tends to attract the edges 17, 17' of the pole shoes, which in turn tends to displace the rotor 11 circumferentially to make it take up a point of maximum saturation. In other words, the entire moving magnetic system tends to take up a position which will give the smallest possible reluctance to the complete magnetic circuit. Should the armature 5 or the rotor 11 not be in a position to pass the maximum amount of flux, there will be a lesser attraction between all the related parts because the magnetic circuit will be open or partially so.

Assuming the tuning fork 4 to be at rest, the armature 5 is rotated. If the tuning fork 4 is now struck, it begins to vibrate in the usual manner, whereupon its pole shoes and the edges 17, 17' thereof will cover one or the other of the outer or inner rows 12 and 13 of the magnetic inserts in the rotor 11. Flux will increase and the rotor 11 will be given an impulse (in either direction) tending to place the inserts 12, 13 in front of teeth 6 of the armature, as the rotor being free, tends to "line up" in the position to pass the maximum flux. Also, the prongs of the tuning fork will be given, by the action of the flux flowing via inserts 12, 13, an impulse, which tends to amplify the vibrations thereof if the impulse acts in the direction of the displacement of the prongs at that instant, which will be the case if the frequency caused by teeth 6, 6' is greater than that of the fork, or to dampen said vibration if the impulse acts in the opposite direction, which is the case if the frequency of teeth 6 is less than that of the fork.

This action repeated as the rotor revolves, maintains the tuning fork in vibration if the frequency applied by 6 is greater than the frequency of the fork and this action will be more clearly understood by reference to the diagrams, Figures 4 to 7, inclusive. In these diagrams only one row of inserts 12 is shown, as it is apparent that the second row 13 will only double the effect. It will be noted that if the position of the poles 17 of the tuning fork 4 were kept steady in any position, the rotation of the armature 5 with respect to the inserts 12, 13 would not revolve the rotor 11, as the inserts therein would be attracted first in a direction to meet the tooth 6 advancing (before the coincidence of the teeth and the inserts) and then in a direction which tends to follow the teeth and the resultant action is null.

The inertia of the rotor 11 does not permit the same to obey the component attractions which succeed each other very rapidly in time. If it is possible to cause the edges 17, 17' of the pole shoes to cover the inserts 12 after the coincidence the rotor will turn and this is precisely what occurs during operation when the armature rotates at a speed somewhat greater than synchronism with the fork, that is to say, when a tooth 6 in the armature takes the place of the preceding tooth therein in a period of time somewhat shorter than the period of the tuning fork.

Assuming that a projection 6 coincides with one of the inserts 12 somewhat before the edge 17 covers the same insert, as illustrated in Figure 4, the attraction exerted by that insert on the edge 17 will reach its maximum value before the latter arrives at the dead point of its movement so that the vibration thereof will be assisted. Also, that the maximum value of the attraction (between teeth and inserts) of the insert 12 for the tooth 6 caused by the edge 17 arriving at the end of its displacement, as shown in Figure 5, will be such as to cause the rotor to undergo a displacement tending to cancel the lead of the armature 5. Owing to the fact, however, that the speed of the armature 5 is higher than that of the vibration of the fork, the rotor will, at the following period of the vibration of the fork, cause a further displacement of the rotor 11, etc., so that the rotor 11 will assume a continuous motion, revolving during a complete period of the tuning fork by an angle equal to the lead gained by the armature 5 during the same time. The tuning fork at each oscillation receives an impulse which maintains its vibrations, while the rotor 11 is driven in the same direction as the armature 5 but with a speed which is evidently equal to the difference between the speed of the armature and the synchronous speed of the tuning fork.

It will also be observed that if a tuning fork is set in vibration and subsequently the speed of the armature 5 becomes lower than the synchronous speed the impulses received by the tuning fork dampen its vibrations, while the rotor 11, provided that the vibrations last with a sufficient amplitude, will receive impulses which will retard the same so that the relative speed of the armature and the rotor will be kept constant.

When the speed of the armature 5 is in exact synchronism with the tuning fork, positive and negative impulses, acting on the rotor 11, will balance, and the latter will not move. Each impulse to the tuning fork will then take place half before and half after the end of each displacement thereof, so that the total impulse will act neither for amplifying nor for dampening the vibrations of the fork and the result will be a null effect, and the vibrations will die out by natural dampening.

From the foregoing, it will be seen that the vibrations of the tuning fork can be maintained and that the speed of the armature 5 may be varied within a rather wide range, and that the free rotor 11, which rotates at a differential speed, will regulate the impulses transmitted through the inserts therein to the pole shoes of the tuning fork.

Comparisons of the frequency of a tuning fork, operated in accordance with the method just described, with the frequencies of a free vibrating fork show that a variation of speed of about 10% in motor 10 does not produce a variation of $\frac{1}{6000}$ in the frequency of the tuning fork 4 and it is therefore apparent that this method permits of obtaining great accuracy together with simplicity of construction, and that the apparatus is robust, relatively inexpensive and easy to handle.

As the frequency of the passages of the inserts 12, 13 of the rotor during a revolution thereof is exactly equal to the difference between the frequency of the tuning fork and the frequency of the passages of the teeth 6 of the armature 5 past the inserts, by visually observing marks or other indicia placed on the rotor it will reveal variations in the frequency of the current driving the armature if the latter is driven by a synchronous motor at 10.

Also, with the relative speed of the armature 5 of the rotor 11 being as constant as the frequency of the tuning fork 4, the device may be used to send current impulses at regular intervals, for instance, by placing on the armature and the rotor suitable contacts.

The regulation of clocks and watches is a rather long operation which is not always carried out with the accuracy required, but which can be, by means of the method and apparatus herein disclosed, accomplished in a few minutes with great accuracy. For this purpose, it is sufficient to transform in any suitable way the rhythmic oscillations of a balance wheel to be regulated (having generally the frequency —5) into electrical impulses, which are suitably amplified and utilized thereafter either for correcting or synchronizing. This transforming can be brought about in any known way and the present method utilized as follows:

A synchronous motor at 10 driving the armature 5 is either fed by a current resulting from the multiplication of the electric impulses derived from the balance wheel to be regulated, or is synchronized only by said impulses, while the tuning fork 4 serves as a standard of frequency. The motor 10 may also be fed by a standard frequency current, the tuning fork being constrained or synchronized by a current the frequency of which is determined by the balance wheel to be regulated, the fork being so constructed in this case as to be able to depart somewhat from its own frequency under the action of external excitation which can be produced in any known manner.

The rotor 11 will be provided with a scale and fixed index; as the frequency of this rotor is proportional to the difference to be corrected, the regulation may be stopped when the displacement of the rotor does not exceed during the operation of the device, a certain number of intervals of the scale during a given time; for instance, one interval during ten seconds; which for a rotor with a scale of 250 intervals and for a rotary speed of the armature 5 of ten revolutions per second, corresponds to an error of $\frac{1}{25000}$. It is therefore possible by this method to reveal in a few seconds a difference which would need a much longer period to determine by the usual methods.

When considering fields of practical application for this method and apparatus it must be remembered that the variations to be studied are much more easily perceived by observing the rotor 11 than the armature 5; said parts rotate with respect to each other at a constant speed equal to the synchronous speed defined by the period of the tuning fork 4.

For the study of frequencies whereof the fluctuations, for instance, are between 49 and 51 periods, the armature 5 might be actuated by a synchronous motor rotating at 600 R. P. M. at 50 periods and the tuning fork 4 might have a rate of vibration corresponding to a synchronous speed of 576 R. P. M.; the speeds of the armature 5 and rotor 11 will then be as follows:

| Frequencies | Driving speed R. P. M. | Relative speed of armature 5 and rotor 11 | Speed of the rotor 11 |
| --- | --- | --- | --- |
| 49 | 576 | 576 | 0 |
| 50 | 588 | 576 | +12 |
| 51 | 600 | 576 | +24 |
|  | 612 | 576 | +36 |

The speed of the rotor 11 may be measured, therefore, to determine the frequency of the current, and the errors of this measure will express the errors of the indicator of frequency only in a ratio equal to the ratio between the speeds of the two members 5 and 11.

In the above table, for instance, at 50 periods, the armature 5 rotates 25 times faster than the rotor 11

$$\left(\frac{600}{24}=25\right)$$

Supposing an error of plus 5% in measuring the speed of the rotor, 25.2 R. P. M. will be read instead of 24 R. P. M. Now 24.2 R. P. M. corresponds to a driving speed of 25.2+576=601.2 R. P. M. corresponding in turn to a frequency of $$50\,\frac{601.2}{600}=50.1 \text{ periods}$$

An error of 5% in the measure of the rotor 11 has involved, therefore, only an error 25 times less (5/1000) in the indication of the frequency. The slower the speed of the loose wheel, or rotor 11, the greater will be the accuracy obtainable.

Certain of the following arrangements permit advantage to be taken of the indications given by the rotor owing to its immobility at synchronism or to its rotation in a negative sense, and are characterized by the fact that the tuning fork must be prevented from dampening out by reason of the fork coincidence lagging behind the fork expansions. Any supplementary means, such as the usual vacuum tube device, can be employed with the fork or any means that will shift the phase relation to allow the impulses from the teeth of the rotor to lead the fork expansion at all times. This method of realizing the positive or null or negative speeds will be useful mainly for indicating small errors in driving speed (or frequency) when said errors are being corrected. The tuning fork 4 can then be given such a period that the normal driving speed will be that which gives immobility of the rotor 11. The mechanism influencing the speed can be corrected until said immobility is reached. Said corrections could be obtained automatically, by utilizing electro-magnetic devices, whereby electric currents are modified by observing the rotation of the rotor—either fast or slow.

In the embodiments hereinafter described, auxiliary and accessory devices are introduced, which constitute parts of the method or apparatus as herein claimed and these are illustrated in the accompanying drawings. Figure 8 represents diagrammatically a frequency comparing device comprising a toothed armature 21 rotated by a motor 22, for instance, a synchronous motor, and a rotor 23 of insulating material wherein are sunk magnetic inserts 24 placed in correspondence to the periphery of the toothed rim 29 of the armature 21. The tuning fork pole shoe edges 17, 17' of Figure 1 are replaced in this figure, Figure 8, by two fixed arcuate pieces of magnetic metal 27 and 28, having a number of extensions 25, 26 connected respectively to each other by magnetic cores 35. This assembly forms a magnet whereof the poles are the rims 27 and 28. Said fixed rims are energized by an alternating current having a standard frequency or a frequency which it is desired to compare with the frequency of passage of the teeth of the armature 21. This energizing alternating current is produced, for instance, by means of a standard tuning fork 30 which induces, by its vibrations, variations of current in a coil or coils 31, said variations being amplified by a suitable amplifier 32 and conveyed into the energizing coils 33, 34 mounted on cores 35, 36 connecting the two rims or edges 25, 26. The operation of this device is the same as that described in connection with Figure 1, the rotor 23 assuming a differential rotary motion, at a speed equal to the difference between the speed of the armature 21 and the frequency of the current given by the fork 30.

The device shown in Figure 9 permits the speed of the rotor 23 to be measured and therefore the difference between the frequency to be measured (22) and the standard frequency (30) can be ascertained. For this purpose the rotor 23 is provided on its periphery with a row of regularly spaced holes 37 through which a beam of light issuing from a source 38 is projected on a photocell 39 operating a relay 40, the armature 41 of which controls a circuit including a source of current 43 and a transformer 44 in the secondary circuit whereof is inserted a milliammeter 45 the deflection of which is proportional to the frequencies of the closing of the relay 40, the whole thus constituting a frequency-meter for reading the rotary speed of the rotor 23. A condenser 42 may be connected across the contacts of the relay 41 to suppress sparking.

Figure 10 illustrates the application of the device to the production of current impulses of constant frequency, said device comprising a standard tuning fork 46 mounted near the rotor 23, which is supported in any suitable manner, such as the rotor 11 in Figure 1, the magnetic circuit through the rotor inserts 24 being completed by the magnet 47 supporting the fork and through the axle 48 of the armature 21 which rotates. Obviously the rotor 23 revolves in an air-gap between the poles of the magnet 46 and a pole neutral thereto formed by the armature 21 driven by the motor 22. The rotor 23 and the armature 21 have near their peripheries a plurality of holes 49, 50 facing each other, through which a beam of light from a source 51, reflected by the prisms or mirrors 52, 53 is projected to a photo cell 54. As the difference between the rotary speeds of 21 and 23 is a constant and is equal to the number of vibrations of the fork 46 divided by the number of teeth 24, for any speed of the armature 21 the frequency of the current impulses generated by the cell 54 is exactly constant and equal or proportional to that of the standard tuning fork 46. It is to be understood that for this purpose the tuning fork arrangement, shown in Figure 8, may be also utilized.

As heretofore indicated, a tuning fork provided with an external constraining device, as well as the tuning fork arrangement shown in Figure 8 or the arrangement hereinafter described in connection with Figure 14 fed by an external source of frequency, allow the detection of variations in frequency in either sense of electrical frequency or speed, and that this method is suitable for regulating frequency. The latter can be accomplished by varying the frequency of the current to the motor 22, Figure 10, or by regulating the current energizing the magnetic circuit 25, 26, Figure 8.

Referring to Figure 11, the foregoing method of control will be clearly understood. The apparatus used may be of the type shown in any of the preceding figures; for example, that shown in Figure 10, the rotor 23 being the same as the rotor 23 in Figure 10 except that it need not contain the holes 49. The shaft of magnetic material, similar to the shaft 14' in Figure 1, carries the rotor and has grooves 66 therein. Below the rotor 23 and engaging the slots 66 in the shaft thereof are the magnetic lever arms 62, 63. These are held in the slots by magnetic attraction. These lever arms 62, 63 are pivoted to one end of the arms 64, 65, the upper ends of the latter arms being pivotally secured to the frame of the machine. A stop 67 limits the travel of the arms in one direction and the contacts 68, 69 limit the travel in the other direction according to the direction of the rotation of the rotor 23.

Assuming that the rotor 23 is being driven by the operation of a circuit connected to the motor 22, Figure 10; for example, if that type of apparatus is employed any variation in the frequency of the current applied to 22 will bring about a change in the rotation of the rotor 23.

Assuming that this is rotating clockwise, arm 63 would then close contact 69 and place the frequency changing means 56 in circuit with current source 60; if the direction of the rotation of the rotor 23 is anti-clockwise, then arm 62 would close the contact 68 putting the frequency regulating device 55 in circuit with the current source 59.

It will be understood that the circu'ts designated by the numerals 57, 58 and their associated current sources 59, 60 and their associated frequency regulators 55, 56 constitute a control means which may be connected to the current source connected to the motor 22 and will therefore regulate the frequency of said source and that any known frequency regulating apparatus may be used for this purpose.

The arm 62, 63 will "float", as it were, on the shaft of the rotor 23 and the instrument can be so adjusted that it will operate the contacts 68, 69 in response to very small changes in frequency.

Figure 14 illustrates another device for measuring the speed of the rotor 23 which consists, for example, in inducing, by the rotation of the rotor, variations in one or more magnetic fields, which will generate currents whereof the intensity will be a function of the speed.

The rotor 23 has an outer edge which overlaps (for instance by 8 mm.) the magnetic inserts 24 which are acted upon by the armature 21. The rotor is also provided, along its outer edge, with a supplementary range of small equidistant magnetic inserts $24_1$, etc., for instance, of a cylindrical shape, having a diameter of 2 mm. and height of 2 mm. A number of little magnets 70, 70', 70", 70''', Figure 15, provided with coils 71, 71', 71", 71''', Figure 16, are disposed around the rotor so that said inserts passing through the field of said magnets generate induced currents in said coils.

In order to prevent said coils from producing a magnetic action capable of hindering the starting of the rotor or its free rotation at slow speeds, said magnets are preferably out of phase with respect to the inserts so that their minimums of reluctance are out of phase during rotation, as shown in Figure 15. By this way the attraction of the different magnets will balance, and the rotor will not be retarded.

The sine-shaped currents created in the different coils will also be out of phase. Said currents may be combined in a utilization apparatus 72, Figure 16, such as a thermal or hot wire meter in which case the readings will indicate differences in speed of the rotor 21, Figure 14, or in a measuring apparatus after having been rectified, as shown in Figure 16, by means of rectifiers 73.

In all the devices described, where the source of standard frequency is external to the apparatus, a higher accuracy is attained than when the tuning fork is incorporated in the device, as said external source can be protected from all possible causes of variations.

Referring to Figures 12 and 13, what is necessary (supposing the tooth 29 of the armature 21 to be positively magnetized) is that said magnetization be transmitted to the tuning fork 46 through the small insert 24 in the rotor and that the insert 24 be attracted by 29, when the tuning fork 46 covers this mass (Figure 13), more actively than when the tuning fork is in the position shown in Figure 12. Should said two conditions be fulfilled, the operation of the apparatus will follow regardless of the specific apparatus employed. In the figures the tuning fork 4 has been connected to the magnet 1 generating the flux so that said tuning fork extremities 17, 17' are polarized oppositely to the teeth 29 of the armature and thus the above conditions are fulfilled. Said conditions, however, are fulfilled also if an active flux emanates from the teeth 29, the tuning fork being unmagnetized.

The inserts 24, which are very small, are attracted very faintly when the tuning fork is in the position shown in Figure 12 and, on the contrary, localizes the lines of force when it is in the position, Figure 13, and conveys much more flux from the teeth 24 to the tuning fork 46 covering the latter. The apparatus, therefore, can operate, the armature being magnetized, without a magnet being connected to the tuning fork.

From the foregoing it will be seen that the tuning fork, such as 4, Figure 1, need not be connected to the armature 5 by a continuous magnetic circuit such as the magnetic member 1. The fork may be disconnected by omitting the member 1 for sufficient magnetic flux from any external field present will find its way through the fork ends and the device will be operated. Figures 12 and 13 illustrate the action of the fork and what is necessary in so far as the magnetic circuit of the apparatus is concerned. These figures may be read in connection with Figure 14.

Referring to Figure 12, suppose the tooth 29 of armature 21 to be magnetized, the magnetic lines issuing from the tooth 29 will pass through the insert 24 in the rotor and penetrate the end of the fork immediately above the insert. If the total number of lines issuing from the tooth 29 is taken to be 100 about 20% of these will pass through the insert 24 and about 2% will reach the fork when it is in the position shown in Figure 12.

Referring now to Figure 13 in which the position of the end of the fork is changed relative to the insert 24, if the total number of lines insuing from 29 be taken as 100 those penetrating the insert 24 may be said to be 60% and those reaching the fork 40%. It will be seen, therefore, that the presence of the fork not only increases the flux (in Figure 13) between the insert 24 and the fork itself from 2 (as in Figure 12) to 40 (as in Figure 13) but also increases the flux between the armature 21 carrying the tooth 29 and the insert 24 from 20 (in Figure 12) to 60 (in Figure 13). The angular magnetic pulses to the insert 24 are thus dependant upon the position of the fork ends.

With the fork disconnected from the magnetic circuit enough flux is absorbed by the fork out of the external field for the foregoing to hold true if the magnetization of the magnetized element of the device is powerful enough.

It will be observed from the perusal of the foregoing specification that this method of operating differential mechanism provides for the operation of three differential elements which may be termed "A", "B" and "C", C being the rotor. Two of these elements (A and B) are linked by magnetic flux flowing across a gap, each of said elements causing periodic changes in said flux flow at its own independent speed or frequency and the third differential element (C) is situated inside or near the flux flow, preferably in an air gap across which the flux passes, and said third element contains magnetic inserts which are magnetically responsive to the flux flow which causes said third element, or rotor, to rotate at a speed expressing the differential relation between the independent frequencies at which said first two elements operate.

It will be seen that the element A may possess a vibratory motion, said vibratory motion constituting the cause of the magnetic changes effecting element C (the rotor) in combination with element B.

Also, element A may be excited at a speed or frequency which is variable or undefined and element B may possess a frequency (due to its form and dimensions) from which it cannot substantially depart, said element B having no excitation whatever applied to it other than the magnetic impulses reaching it through the combined effects of the excitation of A and the displacement of the magnetic inserts of C (the rotor) and of their inter-relation with the frequency of B, these effects integrating in such a manner that such undefined excitation of A will cause both the variations of B and the motion of C to be sustained indefinitely.

Also, the element B may comprise any known form of rotating magnetic field having no apparent or mechanical motion—such for example as a winding having a plurality of pole pieces and arranged to act upon the rotor C to cause the latter to move. And any combination of means A, B and C can be used, provided the conditions as herein set forth as necessary to practice this method are adhered to.

Although the invention has been disclosed in connection with the specific details of preferred embodiments thereof, it must be understood that such details are not intended to be limitative of the invention except in so far as set forth in the accompanying claims.

What is claimed is:

1. In apparatus of the class described, a magnet having vibratory polar extensions, a disk-like rotor having a face adjacent to said extensions, a toothed armature adjacent to the opposite face of said rotor, and means for rotating said armature.

2. In apparatus as claimed in claim 1 wherein the rotor has teeth extending therefrom in a plane perpendicular to the opposed armature face, and the vibratory extension comprises a pair of arcuate polar members overlying said adjacent face of the armature and opposed to said teeth.

3. In apparatus of the class described, a disk-like rotor comprising two concentric rows of magnetic inserts extending through the body of the rotor, magnetic means comprising a toothed armature adapted to rotate adjacent one face of said rotor, a pair of pole pieces opposed to the face of said rotor on the opposite side thereof from said armature, and means for magnetizing said armature and pole pieces.

4. In apparatus of the class described, an armature having a shaft and a face at right angles to said shaft, teeth projecting from said face, a rotor having a shaft said rotor having magnetic inserts spaced apart and opposed to said teeth on said armature, a pair of movable pole pieces opposed to said rotor inserts and each pole piece adapted to span a plurality of said inserts as the rotor revolves, means for revolving said armature, means for moving said pole pieces, and means for magnetizing said armature and pole pieces whereby the armature forms one pole of a magnet and the pole pieces form the other pole thereof, said rotor being free to revolve therebetween.

5. The combination as claimed in claim 4 wherein the means for moving the armature includes a synchronous electric motor.

6. The combination as claimed in claim 4 wherein the means for moving said pole pieces includes a tuning fork.

7. In apparatus of the class described, an armature having a hollow shaft and a face at right angles to said shaft, teeth projecting from said face, a rotor having a shaft rotatably supported to turn freely within said first shaft and out of contact therewith, and said rotor having magnetic inserts spaced apart and opposed to said teeth on said armature, a pair of movable pole pieces opposed to said rotor inserts and each pole piece adapted to span a plurality of said inserts as the rotor revolves, means for revolving said armature, means for moving said pole pieces, and means for magnetizing said armature and pole pieces whereby the armature forms one pole of a magnet and the pole pieces form the other pole thereof, said rotor being free to revolve therebetween.

8. In apparatus of the class described, a tuning fork having pole shoes on its free ends, a rotor and means for supporting the same, said rotor having magnetic inserts adapted to conduct flux through said pole shoes, an armature rotatably supported adjacent said rotor and adapted to conduct flux therethrough, and magnetic means to magnetize said pole shoes, rotor inserts and armature.

9. In apparatus of the class described, a rotor, an armature, means for subjecting said rotor and armature to a magnetic component of two separate frequencies, said rotor and armature having apertures therein, means for causing a beam of light to pass through said apertures, and means located in the emergent beam therefrom adapted to be influenced thereby to perform work.

10. In apparatus of the class described, a rotor, an armature, means for subjecting said rotor and armature to a magnetic component of two separate frequencies, means forming a plurality of equally spaced apertures in said rotor, a light source adapted to transmit a beam of light through said apertures, and means adapted to be operated by the light emerging from said apertures for performing work.

EDMONDO RUSPOLI.